United States Patent
Kim

(10) Patent No.: US 11,208,142 B2
(45) Date of Patent: Dec. 28, 2021

(54) STEERING FEEL CONTROL APPARATUS AND METHOD OF MOTOR DRIVEN POWER STEERING

(71) Applicant: HYUNDAI MOBIS CO., LTD., Seoul (KR)

(72) Inventor: Tae Hong Kim, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 356 days.

(21) Appl. No.: 16/286,168

(22) Filed: Feb. 26, 2019

(65) Prior Publication Data

US 2019/0263441 A1    Aug. 29, 2019

(30) Foreign Application Priority Data

Feb. 27, 2018    (KR) .................. 10-2018-0023496

(51) Int. Cl.
*B62D 5/04*    (2006.01)
*B62D 6/00*    (2006.01)

(52) U.S. Cl.
CPC .......... *B62D 5/046* (2013.01); *B62D 5/0463* (2013.01); *B62D 6/008* (2013.01)

(58) Field of Classification Search
CPC ....... B62D 5/046; B62D 5/0463; B62D 6/008
See application file for complete search history.

(56) References Cited

U.S. PATENT DOCUMENTS

| 7,079,929 B2 * | 7/2006 | Sawada | B62D 5/0472 180/443 |
| 7,226,082 B2 * | 6/2007 | Muramatsu | B62D 1/181 280/771 |
| 10,053,147 B2 * | 8/2018 | Matsuo | B62D 5/0466 |

(Continued)

FOREIGN PATENT DOCUMENTS

| CN | 106864583 | 6/2017 |
| CN | 107215385 | 9/2017 |

(Continued)

OTHER PUBLICATIONS

Chinease Office Action dated Mar. 11, 2021 issued in CN Application No. 201910129016.

(Continued)

*Primary Examiner* — Hussein Elchanti
(74) *Attorney, Agent, or Firm* — DLA Piper LLP (US)

(57) ABSTRACT

A steering feel control apparatus of an MDPS may include: a release steering detection unit configured to detect release steering using column torque or motor current; a reverse steering detection unit configured to detect reverse steering using a steering angular velocity or motor angular velocity; a compensation gain detection unit configured to detect a compensation gain using the steering angular velocity or the motor angular velocity; a high frequency input unit configured to filter the column torque or the motor current and input a high frequency; and a compensation gain compensation unit configured to apply the compensation gain detected by the compensation gain detection unit to the high (Continued)

frequency inputted by the high frequency input unit, when release steering is detected by the release steering detection unit or reverse steering is detected by the reverse steering detection unit.

18 Claims, 2 Drawing Sheets

(56) References Cited

U.S. PATENT DOCUMENTS

| | | | |
|---|---|---|---|
| 10,351,168 B2* | 7/2019 | Tsubaki | B62D 5/0463 |
| 2008/0067960 A1* | 3/2008 | Maeda | B62D 5/046 |
| | | | 318/400.02 |
| 2008/0078608 A1* | 4/2008 | Hara | B62D 15/0235 |
| | | | 180/446 |
| 2009/0125189 A1* | 5/2009 | Matsumura | B62D 5/0466 |
| | | | 701/42 |
| 2013/0066524 A1* | 3/2013 | Kitazume | B62D 6/00 |
| | | | 701/42 |
| 2017/0080970 A1* | 3/2017 | Kezobo | B62D 5/046 |
| 2017/0144697 A1* | 5/2017 | Lim | B62D 6/008 |
| 2019/0300044 A1* | 10/2019 | Tsubaki | B62D 6/007 |

FOREIGN PATENT DOCUMENTS

| | | |
|---|---|---|
| JP | 2568817 | 1/1997 |
| JP | 2002-104219 | 4/2002 |
| JP | 2002-104220 | 4/2002 |
| JP | 2002-362394 | 12/2002 |
| KR | 10-0761210 | 9/2007 |
| KR | 10-2010-0114995 A | 3/2011 |
| KR | 10-1606318 | 4/2016 |

OTHER PUBLICATIONS

English Language Abstract of JP 2002-104219 published Apr. 10, 2002.
English Language Abstract of JP 2002-104220 published Apr. 10, 2002.
English Language Abstract of JP 2002-362394 published Dec. 18, 2002.
English Language Abstract of CN 106864583 published Jun. 20, 2017.
English Language Abstract of CN 107215385 published Sep. 29, 2017.
Korean Office Action dated Aug. 6, 2021 issued in KR Application No. 10-2018-0023496.

* cited by examiner

STEERING FEEL CONTROL APPARATUS AND METHOD OF MOTOR DRIVEN POWER STEERING

CROSS-REFERENCES TO RELATED APPLICATIONS

The present application claims priority to Korean application number 10-2018-0023496, filed on Feb. 27, 2018, which is incorporated by reference in its entirety.

BACKGROUND OF THE INVENTION

The present invention relates to a steering feel control apparatus and method of a motor driven power steering (MDPS), and more particularly, to a steering feel control apparatus and method of an MDPS, which can reduce a sense of difference due to a lack of mechanical friction, inertia or motor responsiveness.

The MDPS has advantages in that it not only has a smaller weight and occupies a smaller space than an existing hydraulic power steering system, but also does not require an oil change. The MDPS facilitates steering by providing a part of steering torque which a driver needs to apply to a steering wheel during vehicle steering, using an auxiliary power source.

That is, a torque sensor connected to the steering wheel senses a steering intention of the driver, and the MDPS receives the sensed signal and drives a motor to provide a suitable force in consideration of the current speed of the vehicle, thereby assisting in a steering force.

The MDPS can save the driver's force by providing a large force when a vehicle is stopped/parked or driven at low speed, and maintain the stability of the vehicle body by providing a relatively small force when the vehicle is driven at high speed.

The related art is disclosed in Korean Publication Patent No. 2010-0114995 published on Oct. 27, 2010 and entitled "Steering Return Method of MDPS".

However, the conventional MDPS does not include a unit for determining whether the steering direction is reversed, and does not specify the characteristics of a required gain.

Besides, since the conventional MDPS cannot accurately determine reversal timing during reverse steering, a steering feel may be degraded. For example, a locking feel may occur or an inertia feel may be degraded.

SUMMARY OF THE INVENTION

Embodiments of the present invention are directed to a steering feel control apparatus and method of an MDPS, which can improve responsiveness by amplifying a high frequency through a compensation gain during reverse steering or release steering, thereby reducing a sense of difference due to a lack of mechanical friction, inertia or motor responsiveness.

In one embodiment, a steering feel control apparatus of an MDPS may include: a release steering detection unit configured to detect release steering using column torque or motor current; a reverse steering detection unit configured to detect reverse steering using a steering angular velocity or motor angular velocity; a compensation gain detection unit configured to detect a compensation gain using the steering angular velocity or the motor angular velocity; a high frequency input unit configured to filter the column torque or the motor current and input a high frequency; and a compensation gain compensation unit configured to apply the compensation gain detected by the compensation gain detection unit to the high frequency inputted by the high frequency input unit, when release steering is detected by the release steering detection unit or reverse steering is detected by the reverse steering detection unit.

The release steering detection unit may include: a release steering signal detection unit configured to encode the column torque or the motor current and detect a sign change of the column torque or the motor current by release steering; and a release steering determination unit configured to determine release steering based on whether the steering angular velocity or the motor angular velocity is equal to or more than a preset value, when the sign change of the column torque or the motor current is detected by the release steering signal detection unit.

The compensation gain detection unit may include: a differentiator configured to detect steering angular acceleration or motor angular acceleration by differentiating the steering angular velocity or the motor angular velocity; a noise removal unit configured to remove noise of the steering angular acceleration or the motor angular acceleration detected by the differentiator; a compensation gain magnitude detection unit configured to detect the magnitude of the compensation gain using the steering angular acceleration or the motor angular acceleration from which noise is removed by the noise removal unit; and a compensation gain maintenance time detection unit configured to detect a maintenance time of the compensation gain according to the steering angular acceleration or the motor angular acceleration from which noise is removed by the noise removal unit.

The magnitude of the compensation gain may be proportional to the magnitude of the steering angular acceleration or the motor angular acceleration.

The compensation gain maintenance time may be counted from the point of time when the release steering or the reverse steering is started.

The compensation gain compensation unit may include: a compensation gain application unit configured to apply the compensation gain detected by the compensation gain detection unit, depending on whether release steering is detected by the release steering detection unit or reverse steering is detected by the reverse steering detection unit; a compensation gain maintenance unit configured to maintain the compensation gain applied by the compensation gain application unit for the maintenance time detected by the compensation gain maintenance time detection unit; and a multiplier configured to apply the compensation gain applied by the compensation gain maintenance unit to the high frequency extracted by the high frequency input unit.

The compensation gain compensation unit may further include a compensation gain limitation unit configured to limit the magnitude of the compensation gain maintained by the compensation gain maintenance unit for the maintenance time.

The steering feel control apparatus may further include a phase compensation unit configured to compensate for the phase of the steering angular velocity or the motor angular velocity, and input the steering angular velocity or the motor angular velocity to the reverse steering detection unit.

The reverse steering detection unit may include: a reverse steering signal detection unit configured to encode the steering angular velocity or the motor angular velocity, and detect a sign change of the steering angular velocity or the motor angular velocity by reverse steering; and a reverse steering determination unit configured to determine reverse steering based on whether the motor current or the column torque is equal to or more than a preset value, when the sign change of the steering angular velocity or the motor angular velocity is detected by the reverse steering signal detection unit.

DESCRIPTION OF SPECIFIC EMBODIMENTS

Figure 1:
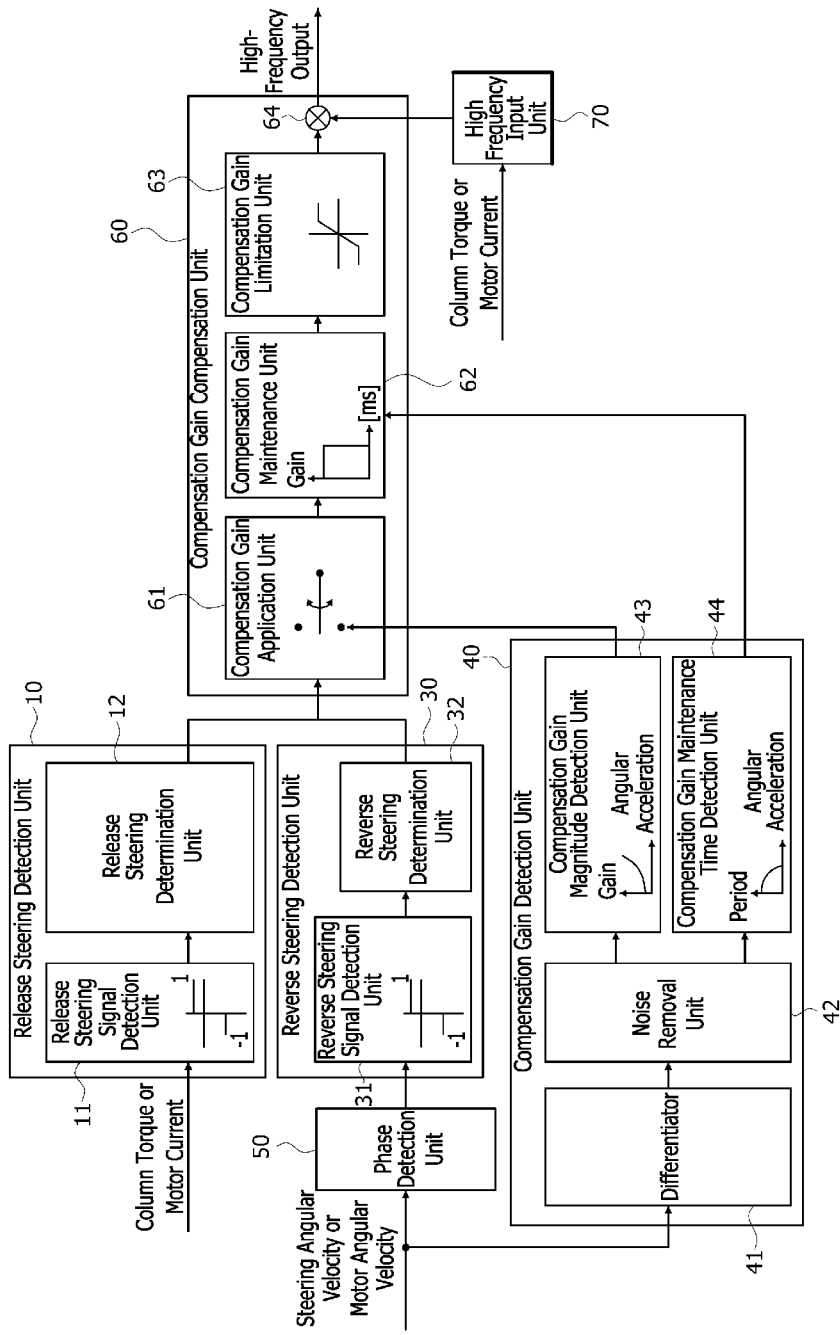
FIG. 1 is a block diagram illustrating a steering feel control apparatus of an MDPS in accordance with an embodiment of the present invention.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereafter, a steering feel control apparatus and method of a motor driven power steering (MDPS) in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Referring to FIG. 1, the steering feel control apparatus of an MDPS in accordance with the embodiment of the present invention may include a release steering detection unit 10, a reverse steering detection unit 30, a compensation gain detection unit 40, a phase compensation unit 50, a compensation gain compensation unit 60 and a high frequency input unit 70.

The release steering detection unit 10 may detect release steering using column torque or motor current.

The release steering detection unit 10 may include a release steering signal detection unit 11 and a release steering determination unit 12.

The release steering signal detection unit 11 may encode the column torque or the motor current and detect a sign change of the column torque or the motor current by release steering.

Typically, when a driver releases a steering wheel (release steering) with a load present due to the weight of a vehicle or the friction between tires and a road surface, the sign of the column torque or the motor current is changed.

Thus, the release steering signal detection unit 11 may encode the column torque or the motor current, and detect whether the sign of the column torque or the motor current is changed from −1 to +1 or from +1 to −1.

When the detection result of the release steering signal detection unit 11 indicates that the sign of the column torque or the motor current was changed, the release steering determination unit 12 may determine whether a steering angular velocity or motor angular velocity is equal to or more than a set value, for example, '0', in order to determine release steering. That is, when the detection result of the release steering signal detection unit 11 indicates that the sign of the column torque or the motor current was changed from −1 to +1 or from +1 to −1, the release steering determination unit 12 may determine whether the steering angular velocity or the motor angular velocity is equal to or more than the set value. When determining that the steering angular velocity or the motor angular velocity is equal to or more than the set value, the release steering determination unit 12 may determine that release steering is performed.

The reverse steering detection unit 30 may include a reverse steering signal detection unit 31 and a reverse steering determination unit 32.

The reverse steering signal detection unit 31 may encode the steering angular velocity or the motor angular velocity, and detect a sign change of the steering angular velocity or the motor angular velocity by reverse steering.

Typically, when a driver reverses a steering wheel (reverse steering) with a load present due to the weight of a vehicle or the friction between tires and a road surface, the sign of the steering angular velocity or the motor angular velocity is changed.

Thus, the reverse steering signal detection unit 31 may encode the steering angular velocity or the motor angular velocity, and detect whether the sign of the steering angular velocity or the motor angular velocity was changed from −1 to +1 or from +1 to −1.

When the detection result of the reverse steering signal detection unit 31 indicates that the sign of the steering angular velocity or the motor angular velocity was changed, the reverse steering determination unit 32 may determine whether the column torque or the motor current is equal to or more than the set value, for example, '0', in order to determine reverse steering. That is, when the detection result of the reverse steering signal detection unit 31 indicates that the sign of the steering angular velocity or the motor angular velocity was changed from −1 to +1 or from +1 to −1, the reverse steering determination unit 32 may determine whether the column speed or the motor current is equal to or more than the set value. When determining that the column speed or the motor current is equal to or more than the set value, the reverse steering determination unit 32 may determine that reverse steering is performed.

The compensation gain detection unit 40 may detect a compensation gain using the steering angular velocity or the motor angular velocity.

The compensation gain detection unit 40 may include a differentiator 41, a noise removal unit 42, a compensation gain magnitude detection unit 43 and a compensation gain maintenance time detection unit 44.

The differentiator 41 may detect steering angular acceleration or motor angular acceleration by differentiating the steering angular velocity or the motor angular velocity.

The noise removal unit 42 may remove noise of the steering angular acceleration or the motor angular acceleration detected by the differentiator 41. The noise removal unit 42 may include a low pass filter.

The compensation gain magnitude detection unit 43 may detect the magnitude of the compensation gain using the steering angular acceleration or the motor angular acceleration from which the noise has been removed by the noise removal unit 42. The magnitude of the compensation gain may be proportional to the magnitude of the steering angular acceleration or the motor angular acceleration.

The compensation gain maintenance time detection unit 44 may detect a maintenance time of the compensation gain using the steering angular acceleration or the motor angular acceleration from which the noise has been removed by the noise removal unit 42. The compensation gain maintenance time may be counted from the point of time when the release steering or the reverse steering is started.

The phase compensation unit 50 may compensate for the phase of the steering angular velocity or the motor angular velocity and input the steering angular velocity or the motor angular velocity to the reverse steering detection unit 30.

As described above, the steering angular acceleration or the motor angular acceleration may be obtained by differentiating the angular velocity or the motor angular velocity through the differentiator 41 and removing noise through the noise removal unit 42, i.e. a low pass filter. In this case, a phase delay may occur, and needs to be compensated for.

The phase compensation unit 50 may provide phase lead or lag through a lead or lag compensator, in order to acquire reverse steering or release steering timing suitable for the characteristics of the vehicle or the MDPS.

The compensation gain compensation unit 60 may apply the compensation gain detected by the compensation gain detection unit 40 to a high frequency extracted by the high frequency input unit 70, when release steering is detected by the release steering detection unit 10 or reverse steering is detected by the reverse steering detection unit 30.

That is, when release steering is detected by the release steering detection unit 10 or reverse steering is detected by the reverse steering detection unit 30, the compensation gain compensation unit 60 may detect the magnitude and maintenance time of a required compensation gain through the magnitude of the steering angular acceleration or the motor angular acceleration, and momentarily amplify and maintain a high frequency gain by applying the compensation gain at the timing that release steering or reverse steering occurs, thereby reducing a sense of difference during the release steering or the reverse steering.

The sense of difference may occur due to a lack of friction of a mechanism or motor or a lack of control responsiveness. Therefore, the compensation gain compensation unit 60 may raise the responsiveness by momentarily amplifying the high frequency gain at the timing of the reverse steering or the release steering, thereby reducing stickiness or locking feel during the reverse steering or the release steering.

The high frequency input unit 70 may extract a high frequency by filtering the column torque or the motor current, and input the extracted high frequency to the compensation gain compensation unit 60.

The compensation gain compensation unit 60 may include a compensation gain application unit 61, a compensation gain maintenance unit 62, a compensation gain limitation unit 63 and a multiplier 64.

The compensation gain application unit 61 may selectively apply the compensation gain detected by the compensation gain detection unit 40, depending on whether release steering is detected by the release steering detection unit 10 or reverse steering is detected by the reverse steering detection unit 30.

In this case, the compensation gain application unit 61 may set the compensation gain to 1, when release steering is not detected by the release steering detection unit 10 or reverse steering is not detected by the reverse steering detection unit 30.

On the other hand, the compensation gain application unit 61 may apply the compensation gain detected by the compensation gain detection unit 40, when release steering is detected by the release steering detection unit 10 or reverse steering is detected by the reverse steering detection unit 30.

The compensation gain maintenance unit 62 may maintain the compensation gain applied by the compensation gain application unit 61 during the maintenance time detected by the compensation gain maintenance time detection unit 44.

When the driver actually releases or reverses the steering wheel, a compensation output needs to be maintained for a predetermined time, such that the MDPS provides a suitable feedback while momentarily maintaining quick responsiveness.

That is, the compensation gain maintenance unit 62 may not output the compensation gain only at the timing of the reverse steering or the release steering, but maintain the compensation gain for the maintenance time from the point of time when the reverse steering or the release steering is started, thereby maintaining the compensation output until the MDPS is steered to a suitable position based on the driver's intention.

The compensation gain maintenance time may be derived through a preset maintenance time tuning map depending on the magnitude of the steering angular velocity or the motor angular velocity.

The compensation gain limitation unit 63 may limit the magnitude of the compensation gain which is retained by the compensation gain maintenance unit 62 for the maintenance time.

The multiplier 64 may apply the compensation gain applied by the compensation gain maintenance unit 62 to the high frequency inputted by the high frequency input unit 70, and input the high frequency to the control logic of the MDPS. Therefore, quick responsiveness can be secured during reverse steering or release steering.

During general steering, a loose or artificial steering feel may occur when a large compensation gain is applied, and side effects may occur when an excessive compensation gain is applied. For example, the control stability of the MDPS may be reduced to cause vibration.

Therefore, during general steering, a basic compensation gain of 1 may be maintained. During reverse steering or release steering, however, the compensation gain detected by the compensation gain detection unit 40 may be applied to raise momentary responsiveness, which makes it possible to remove a sense of difference in steering and maintain the system stability.

Hereafter, a steering feel control method of an MDPS in accordance with an embodiment of the present invention will be described with reference to FIG. 2.

Figure 2:
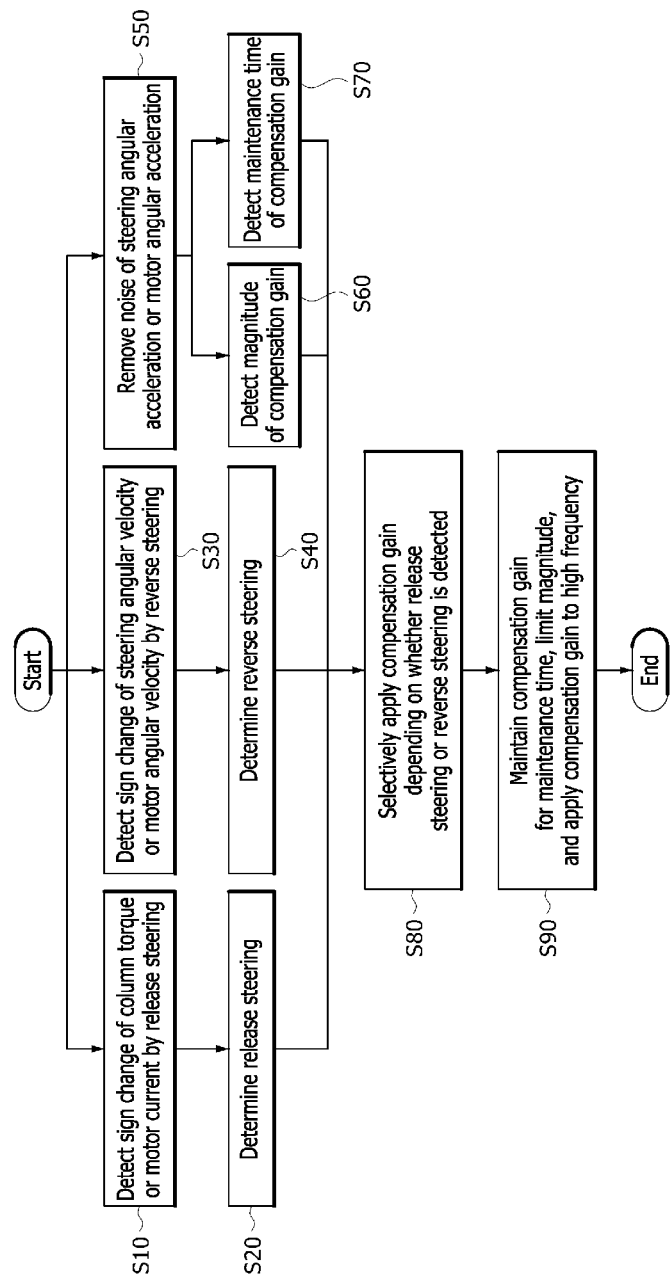
FIG. 2 is a flowchart illustrating a steering feel control method of an MDPS in accordance with an embodiment of the present invention.

FIG. 2 is a flowchart illustrating a steering feel control method of an MDPS in accordance with an embodiment of the present invention.

Referring to FIG. 2, the release steering signal detection unit 11 may encode column torque or motor current to detect a sign change of the column torque or motor current by release steering, at step S10.

Furthermore, when the detection result of the release steering signal detection unit 11 indicates that the sign of the column torque or the motor current was changed from −1 to +1 or from +1 to −1, the release steering determination unit 12 may determine whether a steering angular velocity or motor angular velocity is equal to or more than a set value. When determining that the steering angular velocity or the motor angular velocity is equal to or more than the set value, the release steering determination unit 12 may determine that release steering is performed, at step S20.

The reverse steering signal detection unit 31 may encode the steering angular velocity or the motor angular velocity to detect a sign change of the steering angular velocity or the motor angular velocity by reverse steering, at step S30.

Then, when the detection result of the reverse steering signal detection unit 31 indicates that the sign of the steering angular velocity or the motor angular velocity was changed from −1 to +1 or from +1 to −1, the reverse steering determination unit 32 may determine whether the column torque or the motor current is equal to or more than the set value. When determining that the column torque or the motor current is equal to or more than the set value, the reverse steering determination unit 32 may determine that reverse steering is performed, at step S40.

The compensation gain detection unit 40 may detect a compensation gain using the steering angular velocity or the motor angular velocity.

The compensation gain detection unit 40 may include the differentiator 41, the noise removal unit 42, the compensation gain magnitude detection unit 43 and a compensation gain maintenance time detection unit 44.

The differentiator 41 may detect steering angular acceleration or motor angular acceleration by differentiating the steering angular velocity or the motor angular velocity.

The noise removal unit 42 may remove noise of the steering angular acceleration or the motor angular acceleration detected by the differentiator 41 at step S50, and the compensation gain magnitude detection unit 43 may detect the magnitude of the compensation gain using the steering angular acceleration or the motor angular acceleration from which noise has been removed by the noise removal unit 42, at step S60.

The compensation gain maintenance time detection unit 44 may detect the maintenance time of the compensation gain using the steering angular acceleration or the motor angular acceleration from which the noise has been removed by the noise removal unit 42, at step S70.

At this time, since a phase delay occurs in the steering angular acceleration or the motor angular acceleration when the noise is removed by the noise removal unit 42, the phase compensation unit 50 may provide phase lead or lag through a lead or lag compensator.

As release steering is detected by the release steering detection unit 10 or reverse steering is detected by the reverse steering detection unit 30, the compensation gain compensation unit 60 may apply the compensation gain detected by the compensation gain detection unit 40 to the high frequency extracted by the high frequency input unit 70, and the high frequency input unit 70 may extract a high frequency by filtering the column torque or the motor current, and input the extracted high frequency to the compensation gain compensation unit 60.

That is, the compensation gain application unit 61 may selectively apply the compensation gain detected by the compensation gain detection unit 40, depending on whether release steering is detected by the release steering detection unit 10 or reverse steering is detected by the reverse steering detection unit 30, at step S80.

Then, the compensation gain maintenance unit 62 may maintain the compensation gain applied by the compensation gain application unit 61 for the maintenance time detected by the compensation gain maintenance time detection unit 44. At this time, the compensation gain limitation unit 63 may limit the magnitude of the compensation gain which is retained by the compensation gain maintenance unit 62 for the maintenance time.

Furthermore, the multiplier 64 may apply the compensation gain applied by the compensation gain maintenance unit 62 to the high frequency inputted by the high frequency input unit 70 at step S90. Therefore, quick responsiveness can be secured during reverse steering or release steering.

In accordance with the embodiments of the present invention, the steering feel control apparatus and method of an MDPS can improve responsiveness by amplifying the high frequency gain during reverse steering or release steering. Thus, the steering feel control apparatus and method can reduce a sense of difference caused by a lack of mechanical friction, inertia or responsiveness of a motor, and improve a locking feel or inertial feel, thereby improving a steering feel.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A steering feel control apparatus of an MDPS (Motor Driven Power Steering), comprising:
   a release steering detection unit configured to detect release steering using column torque or motor current;
   a reverse steering detection unit configured to detect reverse steering using a steering angular velocity or motor angular velocity;
   a compensation gain detection unit configured to detect a compensation gain using the steering angular velocity or the motor angular velocity;
   a high frequency input unit configured to filter the column torque or the motor current and input a high frequency; and
   a compensation gain compensation unit configured to apply the compensation gain detected by the compensation gain detection unit to the high frequency inputted by the high frequency input unit, when release steering is detected by the release steering detection unit or reverse steering is detected by the reverse steering detection unit.

2. The steering feel control apparatus of claim 1, wherein the release steering detection unit comprises:
   a release steering signal detection unit configured to encode the column torque or the motor current and detect a sign change of the column torque or the motor current by release steering; and
   a release steering determination unit configured to determine release steering based on whether the steering angular velocity or the motor angular velocity is equal to or more than a preset value, when the sign change of the column torque or the motor current is detected by the release steering signal detection unit.

3. The steering feel control apparatus of claim 1, wherein the compensation gain detection unit comprises:

a differentiator configured to detect steering angular acceleration or motor angular acceleration by differentiating the steering angular velocity or the motor angular velocity;

a noise removal unit configured to remove noise of the steering angular acceleration or the motor angular acceleration detected by the differentiator;

a compensation gain magnitude detection unit configured to detect the magnitude of the compensation gain using the steering angular acceleration or the motor angular acceleration from which noise is removed by the noise removal unit; and a compensation gain maintenance time detection unit configured to detect a maintenance time of the compensation gain according to the steering angular acceleration or the motor angular acceleration from which noise is removed by the noise removal unit.

4. The steering feel control apparatus of claim 3, wherein the magnitude of the compensation gain is proportional to the magnitude of the steering angular acceleration or the motor angular acceleration.

5. The steering feel control apparatus of claim 3, wherein the compensation gain maintenance time is counted from the point of time when the release steering or the reverse steering is started.

6. The steering feel control apparatus of claim 3, wherein the compensation gain compensation unit comprises:

a compensation gain application unit configured to apply the compensation gain detected by the compensation gain detection unit, depending on whether release steering is detected by the release steering detection unit or reverse steering is detected by the reverse steering detection unit;

a compensation gain maintenance unit configured to maintain the compensation gain applied by the compensation gain application unit for the maintenance time detected by the compensation gain maintenance time detection unit; and a multiplier configured to apply the compensation gain applied by the compensation gain maintenance unit to the high frequency extracted by the high frequency input unit.

7. The steering feel control apparatus of claim 6, wherein the compensation gain compensation unit further comprises a compensation gain limitation unit configured to limit the magnitude of the compensation gain maintained by the compensation gain maintenance unit for the maintenance time.

8. The steering feel control apparatus of claim 6, further comprising a phase compensation unit configured to compensate for the phase of the steering angular velocity or the motor angular velocity, and input the steering angular velocity or the motor angular velocity to the reverse steering detection unit.

9. The steering feel control apparatus of claim 1, wherein the reverse steering detection unit comprises:

a reverse steering signal detection unit configured to encode the steering angular velocity or the motor angular velocity, and detect a sign change of the steering angular velocity or the motor angular velocity by reverse steering; and a reverse steering determination unit configured to determine reverse steering based on whether the motor current or the column torque is equal to or more than a preset value, when the sign change of the steering angular velocity or the motor angular velocity is detected by the reverse steering signal detection unit.

10. A steering feel control method of an MDPS, comprising:

detecting, by a release steering detection unit, release steering using column torque or motor current;

detecting, by a reverse steering detection unit, reverse steering using a steering angular velocity or motor angular velocity;

detecting, by a compensation gain detection unit, a compensation gain using the steering angular velocity or the motor angular velocity; and applying, by a compensation gain compensation unit, the compensation gain detected by the compensation gain detection unit to a high frequency inputted by a high frequency input unit, when release steering is detected by the release steering detection unit or reverse steering is detected by the reverse steering detection unit.

11. The steering feel control method of claim 10, wherein in the detecting of the release steering, the release steering detection unit encodes the column torque or the motor current to detect a sign change of the column torque or the motor current by release steering, and determines release steering based on whether the steering angular velocity or the motor angular velocity is equal to or more than a preset value, when the sign change of the column torque or the motor current is detected.

12. The steering feel control method of claim 10, wherein in the detecting of the compensation gain, the compensation gain detection unit detects steering the angular acceleration or the motor angular acceleration by differentiating the steering angular velocity or the motor angular velocity, removes noise of the detected steering angular acceleration or the motor angular acceleration, detects the magnitude of the compensation gain using the steering angular acceleration or the motor angular acceleration from which noise is removed, and detects a maintenance time of the compensation gain according to the steering angular acceleration or the motor angular acceleration.

13. The steering feel control method of claim 12, wherein the magnitude of the compensation gain is proportional to the magnitude of the steering angular acceleration or the motor angular acceleration.

14. The steering feel control method of claim 12, wherein the compensation gain maintenance time is counted from the point of time when the release steering or the reverse steering is started.

15. The steering feel control method of claim 12, wherein in the applying of the compensation gain, the compensation gain compensation unit applies the compensation gain detected by the compensation gain detection unit, depending on whether release steering is detected by the release steering detection unit or reverse steering is detected by the reverse steering detection unit, maintains the applied compensation gain for the maintenance time, and applies the high frequency inputted by the high frequency input unit.

16. The steering feel control method of claim 15, wherein in the applying of the compensation gain, the magnitude of the compensation gain is limited for the maintenance time.

17. The steering feel control method of claim 15, further compensating for the phase of the steering angular velocity or the motor angular velocity, and inputting the steering angular velocity or the motor angular velocity to the reverse steering detection unit.

18. The steering feel control method of claim 10, wherein in the detecting of the reverse steering, the reverse steering detection unit encodes the steering angular acceleration or the motor angular acceleration to detect a sign change of the steering angular acceleration or the motor angular acceleration by reverse steering, and determines reverse steering based on whether the motor current or the column torque is equal to or more than a preset value, when the sign change of the steering angular acceleration or the motor angular acceleration is detected.

\* \* \* \* \*